(12) United States Patent
Xu et al.

(10) Patent No.: US 6,521,274 B1
(45) Date of Patent: Feb. 18, 2003

(54) PREPARED ROYAL JELLY WITH CALORIC VALUE

(75) Inventors: Ying Ying Xu, Kanagawa (JP); Masayuki Nomura, Kanagawa (JP)

(73) Assignee: Cera Rica Noda Co., Ltd., Kanagawa (JP)

( * ) Notice: Subject to any disclaimer, the term of this patent is extended or adjusted under 35 U.S.C. 154(b) by 0 days.

(21) Appl. No.: 09/542,846

(22) Filed: Apr. 4, 2000

(30) Foreign Application Priority Data

Apr. 9, 1999 (JP) .......................................... 11-102415

(51) Int. Cl.⁷ .............................................. A23C 1/076
(52) U.S. Cl. ...................... 426/103; 426/513; 426/518; 426/658; 426/648; 426/804
(58) Field of Search .............................. 426/3, 48, 548, 426/658, 804, 456, 461, 465, 511, 634, 573, 578, 648, 103

(56) References Cited

U.S. PATENT DOCUMENTS

| | | | | |
|---|---|---|---|---|
| 4,405,602 A | * | 9/1983 | Ilies | 424/95 |
| 4,939,123 A | * | 7/1990 | Neeser et al. | 514/8 |
| 5,413,572 A | * | 5/1995 | Wong et al. | 604/892.1 |
| 5,523,099 A | * | 6/1996 | Aga et al. | 426/3 |
| 5,629,040 A | * | 5/1997 | Takemori et al. | 426/548 |

FOREIGN PATENT DOCUMENTS

| | | | | |
|---|---|---|---|---|
| JP | 35913586 A | * | 8/1984 | |
| JP | 360037942 A | * | 2/1985 | |
| JP | 61242560 A | * | 4/1985 | |
| JP | 405007464 | * | 1/1993 | |
| JP | 406078696 A | * | 3/1994 | |
| JP | 406292523 A | * | 10/1994 | |

OTHER PUBLICATIONS

Smith et al, Soybeans: Chemistry and technologyt, The AVI Publishing Company, Inc., 1972, vol. 1, 81–88.*
Palma, Journalof Apicultural Research vol. 31 (1), 1992, pp. 42–44.*

* cited by examiner

Primary Examiner—Nina Bhat
(74) Attorney, Agent, or Firm—Rader, Fishman & Grauer PLLC

(57) ABSTRACT

Provided is a preparative royal jelly with low caloric value, which contains a raw royal jelly, erythritol and oligosaccharide derived from soybean, and is in the form of a paste.

4 Claims, No Drawings

PREPARED ROYAL JELLY WITH CALORIC VALUE

BACKGROUND OF THE INVENTION

1. Field of the Invention

The present invention relates to a preparative royal jelly excellent in its taste and human health.

2. Related Arts or Background of the Invention

The royal jelly is a viscous substance with milk-white or pale yellowish color, which is given to honey bee larvae and a queen bee and has been known from old times as efficacious one of perpetual youth and longevity, nourishment, robustness and so on.

The royal jelly as commodities is classified into a—raw royal jelly—,—dried royal jelly—which is lyophilized product of the raw royal jelly, and—preparative royal jelly—which is prepared by composing an auxiliary material or additive to the raw or dried royal jelly and has been marketed as a healthy food, alimentary and roborantal preparation or nutriental supplement.

An intaking amount of the royal jelly required for developing its efficacy has generally been said as 300 mg—3 g/day in Japan and 3–5 g/day in China based on the amount of the raw royal jelly, the effective amount cannot definitely state, since the royal jelly has not been authorized as a medicine.

It has been considered that the royal jelly develops its most superior efficacy when it is ingotten in raw state, but the single intake of raw royal jelly gives a somewhat burden to the person, since the royal jelly has an inherent styptic taste stimulating a tongue. The royal jelly is one of natural products with delicate properties and troublesome handling is required as requiring refrigeration or freezing to keep its freshness.

Therefore, the royal jelly has widely marketed as the preparative royal jelly, in which honey, lactose or the like sweetener is generally added. However, many of such preparative royal jellies contain the sweetener in a large amount, in order to reduce the styptic taste of the raw royal jelly. As a result, the caloric intake becomes larger, which is neither match with the essential purpose of the royal jelly intake nor meet to the present intention to health.

SUMMARY OF THE INVENTION

Therefore, an object of the present invention is to provide a preparative royal jelly with low caloric value, wherein styptic taste inherent to raw royal jelly has been remarkably suppressed, and taste is good to show nice effect in human health.

An additional object of the invention is to provide the preparative royal jelly accommodated in a vessel in the form of making intake thereof easy.

As a result of intensive study and investigation for attaining the objects, the inventors have found facts that styptic taste of the raw royal jelly disappears, taste is excellent, caloric value is low, and an action for controlling function of intestinal tracts can be expected, by a preparative royal jelly which is a paste and comprises a raw royal jelly, erythritol, and oligosaccharides derived from soy bean, to establish the invention.

An intrinsic efficasy of the raw royal jelly cannot be expected, if an amount thereof in the preparative royal jelly is less than required intake of 3–5 g/day. While, if the content of raw royal jelly is too large, the inherent styptic taste increases, so that the object of the invention cannot be attained.

Among the ingredients or components of the preparative royal jelly according to the invention, erythritol is selected by taking its sweetness and taste into consideration. The erythritol is one of sugaralcohols, a natural glycide contained also in fermented foods in addition to various fruits etc., and the sole substance having no calorie within the glycides, since it cannot be metabolized in the body. Therefore, the erythritol can be added in an optional amount, but it is preferable to add 50–200% by weight to the raw royal jelly.

The oligosaccharide derived from soybean is also selected by taking its taste. It has been well known that oligosaccharides accelerate propagation of useful bacteria in intestinal tracts to develop an action for controlling function of the intestinal tracts. Human digestive enzymes cannot decompose the oligosaccharide and thus it can be composed in an optional amount, but it is preferable to add 50–200% by weight to the raw royal jelly.

If necessary, a flavor, coloring matter, viscosity increasing agent and the like used for general foods can be further added to the preparative royal jelly according to the invention.

The preparative royal jelly according to the invention is a paste- like product and thus can be accommodated in a vessel, such as a laminated tube, whereby deterioration of the raw royal jelly in the product, due to oxidation can be inhibited and foreign feeling on the intake of the royal jelly can be avoided by spreading the same on a bread such as a butter.

DETAILED DESCRIPTION OF PREFERRED EMBODIMENTS

The invention will now be explained in more detail with reference to an Example and Test Example.

EXAMPLE 1

Production of Preparative Royal Jelly with Low Caloric Value

An erythritol powder (40 g) was added to water (30 g) to heat and dissolve the same. After leaving the solution to cool the same, raw royal jelly (20 g) and oligosaccharide (10 g) derived from soybean were added to sufficiently stir to obtain a desired preparative royal jelly with low caloric value.

If the preparative royal jelly would be intaken by 20 g at a time, which corresponds to intake of 4 g of raw royal jelly to satisfy the required intake of the same per day.

EXAMPLE 2

Filling into Vessel

The preparative royal jelly with low caloric value obtained by Example 1 was filled into a laminated tube to obtain the preparative royal jelly accommodated in the tube.

TEST EXAMPLE

Organoleptic Test

An organoleptic test was carried out as to the preparative royal jelly obtained by Example 1 by a panel of 23 members to check visual appearance, color tone, hardness (stickiness or viscosity), sweetness, after-taste, and taste on a 5-point scale in which the highest point is 5.

As a control, similar organoleptic test was carried out with use of a raw royal jelly to compare the both royal jellies.

Mean points of the all panelists are shown in Table 1 given later. Each of the mean points on the preparative royal jelly (Example 1) according to the invention exceeds that on the raw royal jelly, in all evaluation items and the Table particularly shows that the styptic taste inherent to the raw royal jelly disappears in the preparative royal jelly.

The tested preparative royal jelly with low caloric value does not contain a flavor, coloring matter, viscosity increasing agent or the like, but the evaluation will become higher by composing such a substance in suitable amount.

TABLE 1

| Evaluation item | Example 1 | Control |
|---|---|---|
| Visual appearance | 4.4 | 3.8 |
| Color tone | 4.3 | 3.5 |
| Hardness | 4.0 | 3.4 |
| Sweetness | 3.8 | 1.7 |
| After-taste | 3.2 | 1.3 |
| Taste | 3.1 | 1.6 |
| Mean point in all evaluation items | 3.8 | 2.6 |

What is claimed is:

1. A prepared royal jelly comprising raw royal jelly, erythritol, and oligosaccharide derived from soybean, and in the form of a paste.

2. A prepared royal jelly as claimed in claim 1, wherein each of said erythritol and oligosaccharide is composed in a ratio of 50 to 200% by weight to said raw royal jelly.

3. A prepared royal jelly comprising raw royal jelly, erythritol, and oligosaccharide derived from soybean, in a laminated vessel.

4. A prepared royal jelly comprising raw royal jelly, erythritol, and oligosaccharide derived from soybean, and presenting in the form of a paste, in a laminated vessel, wherein each of said erythritol and oligosaccharide is composed in a ratio of 50 to 200% by weight to said raw royal jelly.

* * * * *